J. H. LANHAM.
COTTON CHOPPER.
APPLICATION FILED MAY 7, 1914. RENEWED FEB. 13, 1915.
1,133,044.
Patented Mar. 23, 1915.
3 SHEETS—SHEET 1.
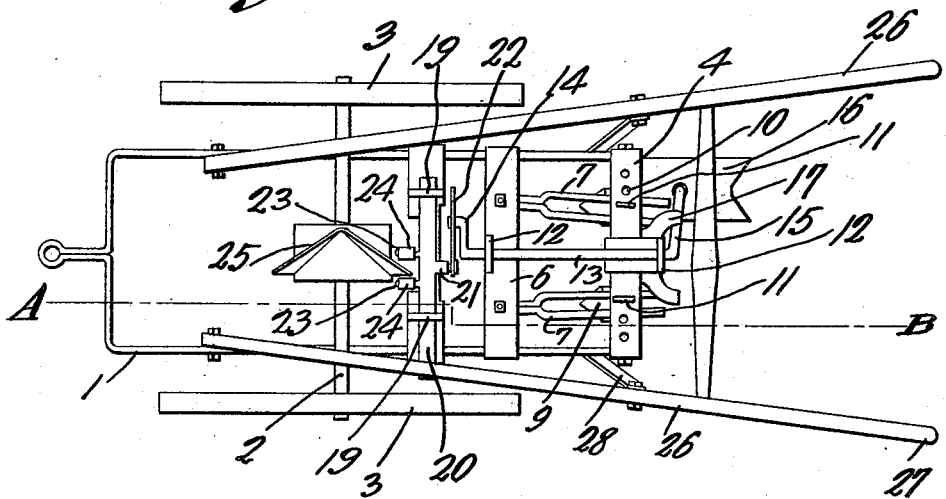
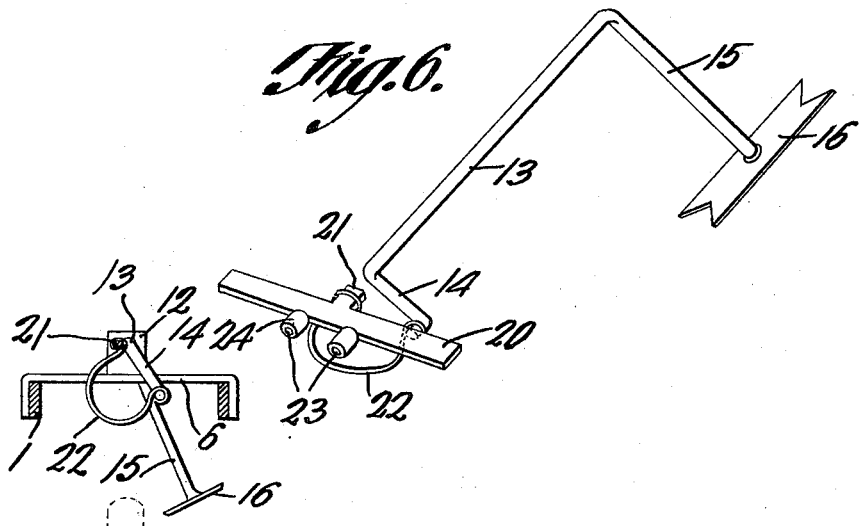
Witnesses
J. H. Lanham
Inventor
by C. A. Snow & Co.
Attorneys

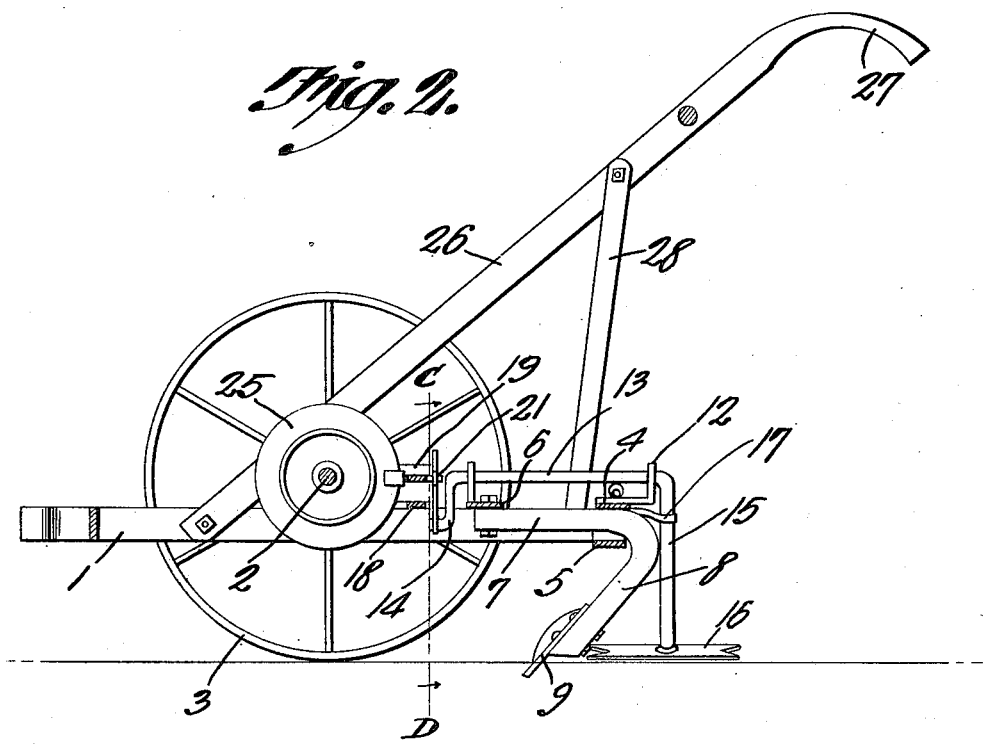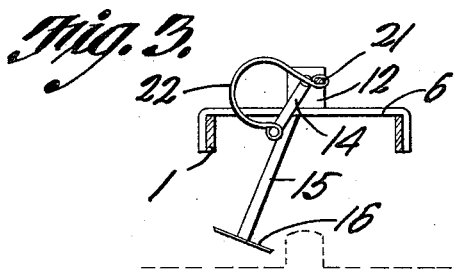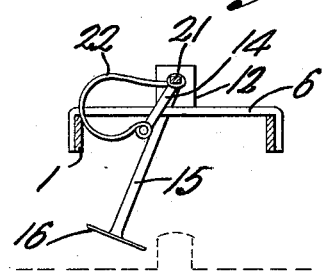

J. H. LANHAM.
COTTON CHOPPER.
APPLICATION FILED MAY 7, 1914. RENEWED FEB. 13, 1915.
1,133,044.
Patented Mar. 23, 1915.
3 SHEETS—SHEET 3.
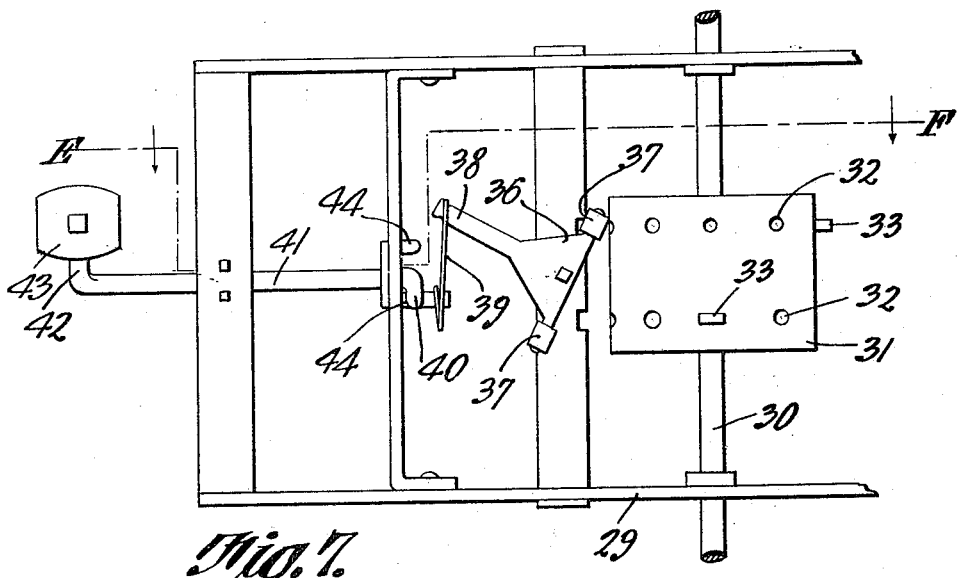
Fig. 7.
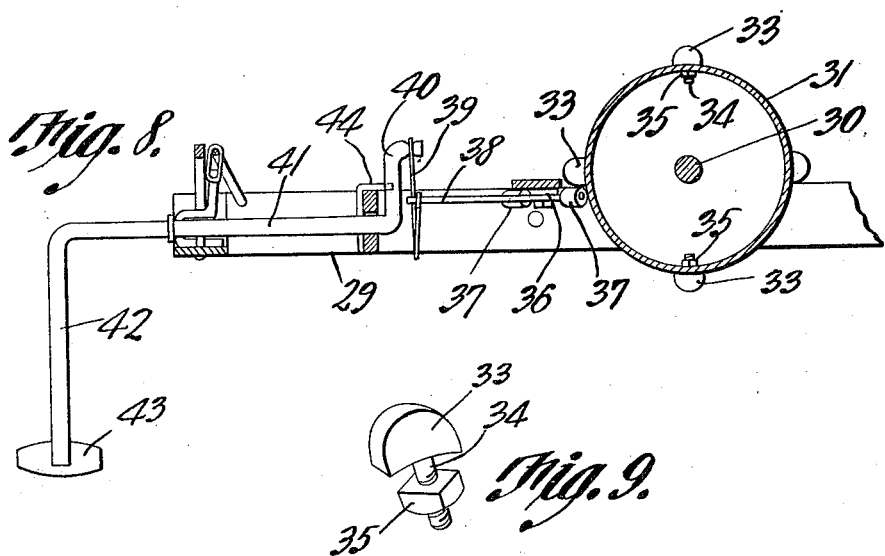
Fig. 8.
Fig. 9.
Witnesses
J. H. Lanham  Inventor
by C. A. Snow & Co.
Attorneys

UNITED STATES PATENT OFFICE.

JAMES HENRY LANHAM, OF ROME, GEORGIA, ASSIGNOR TO ALLIE W. WATTERS, OF ROME, GEORGIA.

COTTON-CHOPPER.

1,133,044.  Specification of Letters Patent.  Patented Mar. 23, 1915.

Application filed May 7, 1914, Serial No. 837,038. Renewed February 13, 1915. Serial No. 8,074.

*To all whom it may concern:*

Be it known that I, JAMES HENRY LANHAM, a citizen of the United States, residing at Rome, in the county of Floyd and State of Georgia, have invented a new and useful Cotton-Chopper, of which the following is a specification.

This invention relates to cotton choppers, one of its objects being to provide means whereby the hoe of the machine is always actuated across the row at practically the same speed irrespective of the speed at which the machine is traveling forward, motion being transmitted to the hoe from the supporting wheels.

Heretofore, in machines in which the hoe is actuated by the rotation of the supporting wheels, the speed of movement of the hoe has been dependent upon the speed at which the machine has moved forward and, consequently, when the machine has been moved slowly, the hoe has not operated efficiently to chop out the plants in the path thereof.

As hereinbefore stated, one of the objects of the present invention is to avoid this objection by providing means whereby the hoe will always move transversely of the row at the same speed no matter how fast the machine, as a whole, may be moved.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine. Fig. 2 is a vertical longitudinal section on the line A—B Fig. 1. Fig. 3 is a section on line C—D Fig. 2 and showing the relative positions of the hoe and its actuating spring when the hoe is at one limit of its movement. Fig. 4 is a view similar to Fig. 3 and showing the relative positions of the parts immediately prior to the movement of the hoe to its other extreme position, the spring being under stress and about ready to shift the hoe. Fig. 5 is a view similar to Figs. 3 and 4 and showing the relative positions of the parts after the hoe has been shifted to its second position by the spring. Fig. 6 is a perspective view of the hoe and its actuating slide and spring. Fig. 7 is a bottom plan view of a portion of a cotton chopping machine and showing a modified means for transmitting motion to the chopping blade or hoe. Fig. 8 is a section on line E—F Fig. 7. Fig. 9 is a detail view of one of the tappets used in connection with the structure shown in Figs. 7 and 8.

Referring to the figures by characters of reference 1 designates the frame of the machine, the same being supported by a revoluble axle 2 secured to the supporting wheels 3. Upper and lower cross strips 4 and 5 respectively constitute the back end of the frame and a cross strip 6 connects the sides of the frame in advance of the strips 4 and has secured to it the forward ends of rearwardly extending beams 7. These beams project between the cross strips 4 5 and merge into standards 8 to which cultivator shovels 9 are adapted to be secured. Apertures 10 are formed in the cross strips 4 and 5 and are adapted to receive holding pins 11 which are insertible into the beams 7 and operate to hold the beams against lateral swinging.

Formed on or secured to the strips 4 and 6 are brackets 12 in which is journaled a longitudinal shaft 13 provided at its front end with a crank arm 14 while extending from its rear end is a radial arm 15. A hoe 16 is secured at its center to the arm 15, said arm being extended perpendicularly from the hoe and the said hoe being formed with two active edges which are parallel with each other and extend parallel with the longitudinal center of the machine. Rearwardly diverging stop fingers 17 extend from the strip 4 and the arm 15 projects downwardly between them so that the oscillation of said arm is thus limited.

A cross strip 18 is carried by the frame 1 in front of the strip 6 and has guide ears 19 upstanding therefrom. A slide 20 is mounted to reciprocate within these ears and has a rearwardly extending stud 21 to which is pivotally connected one end of a bowed spring 22, the other end of the bowed spring being pivotally connected to the free end of the crank arm 14. Spring 22 is substantially U-shaped.

Extending forwardly from the slide 20 are studs 23 having rollers 24 journaled thereon. A cam 25 is secured to the axle 2 so as to rotate therewith and projects between the rollers. This cam is preferably so proportioned that, during one complete rotation of the axle 2 and cam 25, the slide 20 will receive two reciprocations.

Strips 26 are secured at their front ends to the frame 1 and are inclined upwardly and rearwardly and terminate in handles 27, these strips being provided with suitable braces 28.

It will be understood that when the machine moves forward, the cam 25 will be rotated and will bear against one or the other of the rollers 24 so as to shift the slide 20 first toward one side of the machine and then toward the other side. Assuming that the chopping hoe is in the position illustrated in Fig. 3 and the slide 20 is at the beginning of its movement, it will be seen that, as the slide is shifted transversely of the machine, the stud 21 will be brought gradually past the axis of rotation of the shaft 13, thus gradually distorting the spring 22 and placing the spring under stress, as shown in Fig. 4. Immediately after the stud 21 passes the axis of rotation of shaft 13, the spring operates to swing the crank arm 14 to the position shown in Fig. 5, thus causing the hoe to swing from one extreme position to the other and to chop out any plants in the path thereof. During the movement of the slide 20 in the opposite direction the action of the spring is the same, said spring operating to suddenly actuate the hoe so as to swing it back to its first position as soon as the stud 21 has been brought past the axis of rotation of the shaft 13. Thus it will be seen that the spring 22 constitutes the means for actuating the hoe and, no matter how fast the slide 20 may be actuated, the spring will not be brought into play to shift the hoe until the stud 21 has been brought to a predetermined position whereupon the hoe will be swung to one side at a speed which is always the same irrespective of the speed at which the machine is moved forward.

In Figs. 7, 8 and 9 a slightly modified structure has been shown. In this structure the frame 29 is supported by an axle 30 similar to the axle 2 but instead of securing to the axle a cam such as has been heretofore described, a drum 31 is attached thereto, this drum being formed adjacent each end, with an annular series of apertures 32 any one of which is adapted to receive a tappet such as shown in Fig. 9. Each tappet includes a rounded head 33 having a threaded stem 34 insertible into one of the openings 32 and secured therein by means of a nut 35. Furthermore, instead of utilizing a slide such as shown at 20, a T-shaped lever 36 is supported by the frame, the two short arms of the lever being provided with anti-friction rollers 37 while the long arm 38 of the lever is connected, by a bowed spring 39, to a crank arm 40 similar to the arm 14, this crank arm being connected to a shaft 41 having a radial arm 42 to which a hoe 43 is secured. Stop fingers 44 may be provided for limiting the swinging movement of the crank arm 40.

It is to be understood that the rollers 37 are movable into the paths of the tappets 33. During the rotation of drum 31, one of the tappets 33 will strike against the roller 37 in the path thereof, thus shifting lever 36 so that its arm 38 will move past the axis of rotation of the shaft 41, thus successively placing spring 39 under compression and bringing it to position where it can expand and shift the crank arm 40, thus to actuate the hoe 43 in the manner hereinbefore described. This movement of lever 36 will bring the other roller into the path of a tappet near the opposite end of the drum. Consequently, by disposing the tappets in staggered relation, the lever 36 will be oscillated by the continuous rotation of the drum 31. It is to be understood that the tappets 33 can be placed in any desired relation to each other so that the hoe can thus be actuated whenever desired.

What is claimed is:—

1. A cotton chopper including a hoe, a crank arm movable therewith, a shiftable member, means operated by the forward movement of the machine for actuating said member back and forth, and a spring connection between the member and crank arm for actuating the crank arm.

2. The combination with a wheel supported structure and a hoe carried thereby and mounted for lateral oscillation, of a crank arm movable with the hoe, a spring connected to the crank arm, and means operated by the forward movement of the machine for placing the spring under stress and releasing it successively, thereby to oscillate the hoe under the action of the spring.

3. The combination with a wheel supported structure and a hoe mounted for lateral oscillation, of a movable member, means operated by the forward movement of the machine for moving said member back and forth, a spring connected to the member, a connection between the spring and hoe, said member operating during its movement in each direction to place the spring under compression and release it successively thereby to actuate the hoe.

4. The combination with a wheel supported structure, of a longitudinal shaft, a hoe connected thereto and mounted for lateral oscillation, a movable member, means operated by the forward movement of the machine for actuating said member back and forth, a crank arm movable with the shaft, and a spring connection between the crank arm and the movable member, for actuating the shaft and hoe.

5. The combination with a wheel supported structure, a longitudinal shaft journaled thereon, and a hoe mounted for lateral oscillation and movable with the shaft, of a movable member, means operated by the forward movement of the machine for moving said member back and forth, a crank arm extending from the shaft, a spring thereon and secured to the member, said member operating during its movement in each direction to place the spring under compression and then to shift the line of force exerted by the spring to permit expansion of the spring and actuation of the crank arm and hoe.

6. A cotton chopper including a wheel supported structure, a shaft thereon, a hoe movable with the shaft and adapted to oscillate laterally, a crank arm movable with the shaft, a spring connected at one end to the crank arm, a movable member, means operated by the forward movement of the machine for actuating the member back and forth thereby to compress the spring between the member and the crank arm during each movement of the member and to subsequently release the spring to expand against the crank arm and swing the hoe.

7. The combination with a wheel supported structure, of a shaft supported thereby, a laterally movable hoe carried by the shaft, a crank arm upon the shaft, a movable member, an actuating device revoluble with the supporting wheels, means upon the member and engaging the actuating device whereby said member is actuated back and forth during the forward movement of the machine, and a spring connection between the member and the crank arm, said member and crank arm coöperating to place the spring under stress during a portion of the movement of the member in each direction and said spring being released during the completion of such movement of the member to actuate the crank arm.

In testimony that I claim the foregoing as my own, I have hereto affixed my signature in the presence of two witnesses.

JAMES HENRY LANHAM.

Witnesses:
J. A. JENKINS,
FLORENCE JENKINS.

Copies of this patent may be obtained for five cents each, by addressing the "Commissioner of Patents, Washington, D. C."